July 22, 1969  SHICHIZAEMON MOGI ET AL  3,456,575
APPARATUS FOR MAKING PUFFED FOODS
Filed March 28, 1966  4 Sheets-Sheet 1
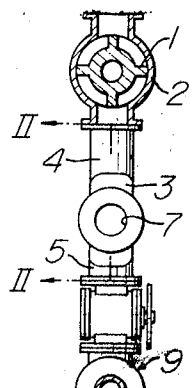
FIG. 1
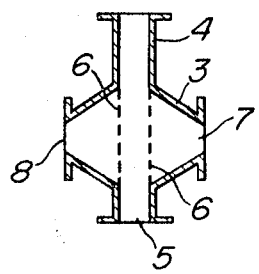
FIG. 2
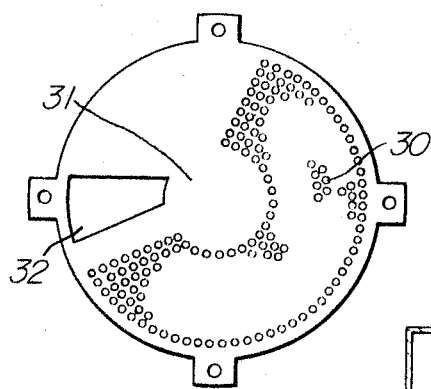
FIG. 3
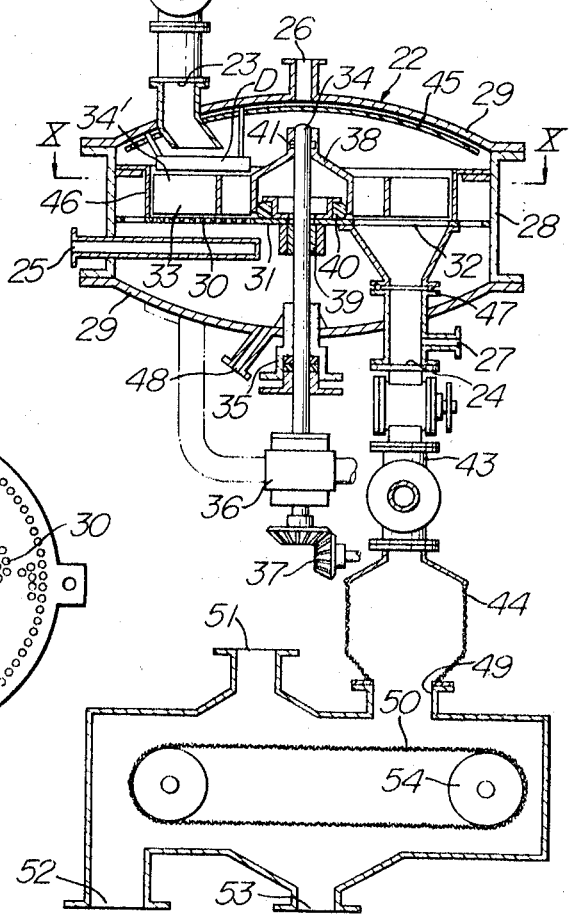
INVENTORS
Shichizaemon Mogi,
Ryozo Toki and
Masaichiro Yamaguchi
BY Wenderoth, Lind & Ponack,
ATTORNEYS July 22, 1969  SHICHIZAEMON MOGI ET AL  3,456,575
APPARATUS FOR MAKING PUFFED FOODS
Filed March 28, 1966  4 Sheets-Sheet 3
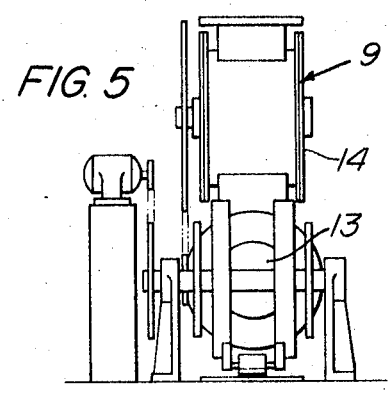
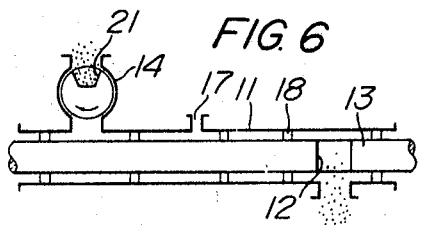 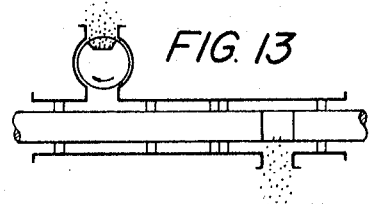
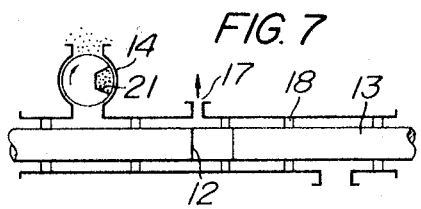 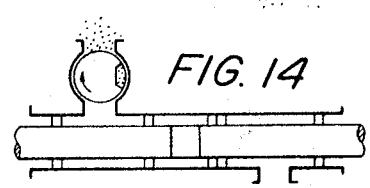
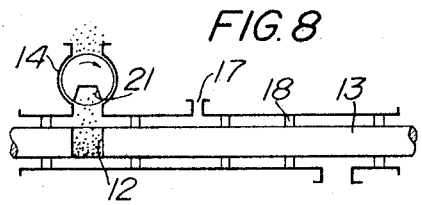 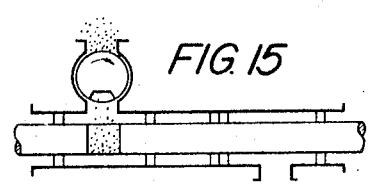
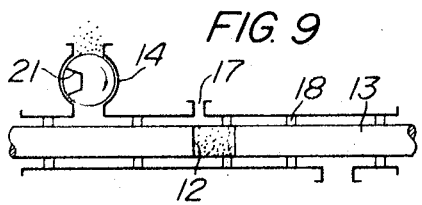 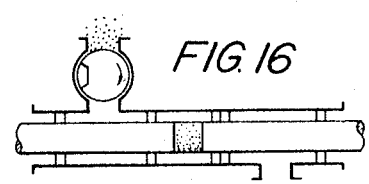

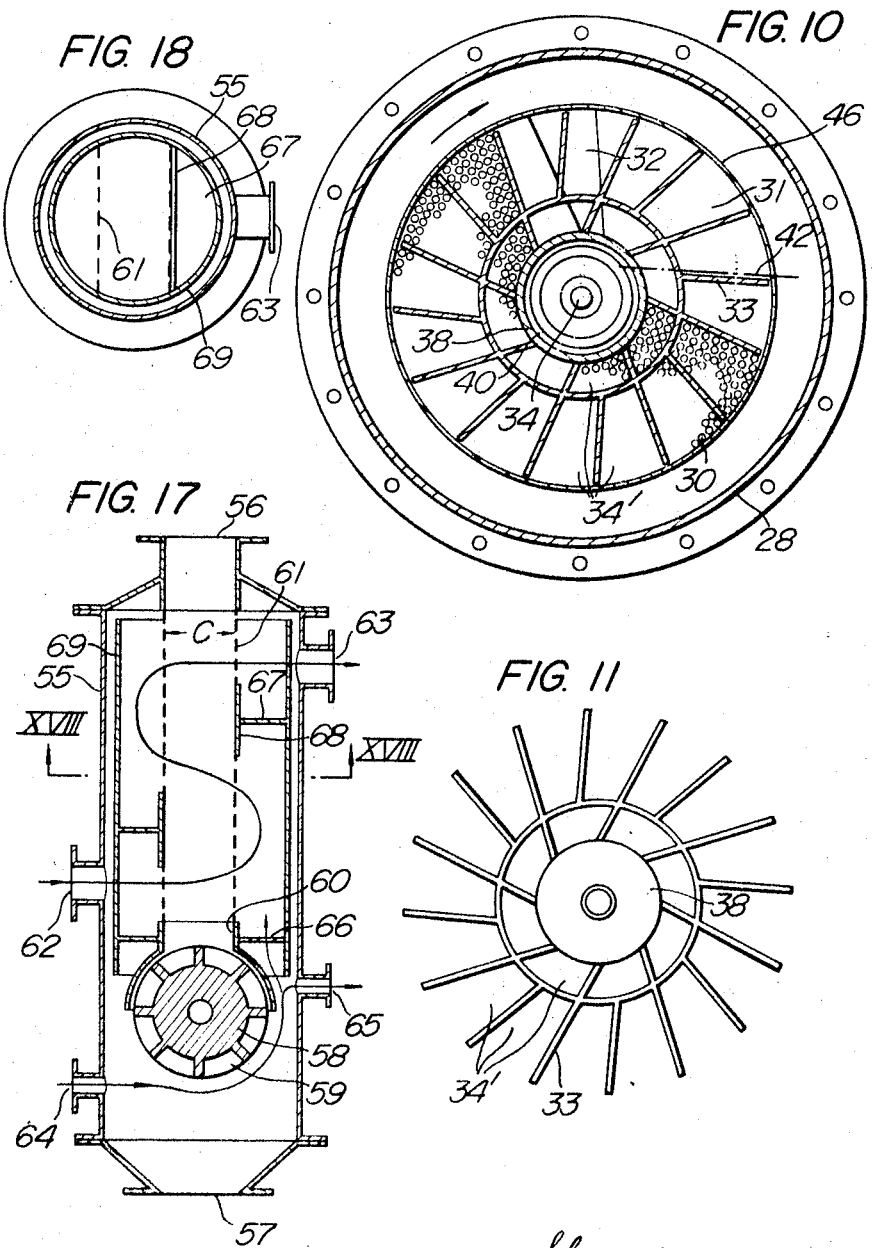

United States Patent Office 3,456,575
Patented July 22, 1969

3,456,575
APPARATUS FOR MAKING PUFFED FOODS
Shichizaemon Mogi, Noda-shi, Ryozo Toei, Kyoto, and Masaichiro Yamaguchi, Noda-shi, Japan, assignors to Kikkoman Shoyu Co., Ltd., Noda-shi, Japan, a corporation of Japan
Filed Mar. 28, 1966, Ser. No. 537,730
Claims priority, application Japan, Feb. 14, 1966, 41/8,409
Int. Cl. A47j 27/08, A23l 1/18
U.S. Cl. 99—238                                                2 Claims

ABSTRACT OF THE DISCLOSURE

Apparatus for continuous puffing of food by passing a pressurized heating gas such as superheated steam through a layer of food in a pressurized heating vessel and suddenly ejecting the heated food into a space of lower pressure, the heating vessel being isolated from the atmosphere by locking valves at the inlet and outlet. The heating chamber may comprise a circular perforated shelf plate provided with a bladed wheel above the plate to move the food to an opening leading to the outlet lock valve or the heating chamber may be provided with vertical perforated plates to form a channel through which the food descends to a bladed rotor. In either case, the heating gas passes through the perforations.

---

This invention relates to apparatus for making puffed foods.

According to the principles of the present invention, puffed food is made by heating the food material through the medium of pressurized heating gas such as superheated steam and suddenly ejecting the material thus heated into a gas space of lower pressure.

Previously, in the making of puffed foods such as puffed wheat, potato, sweet potato, carrot and apple, the raw material has been placed in a cylindrical pressure vessel and the vessel after being hermetically closed has been heated externally by flame means while being rotated with the intention of obtaining a uniform heat-transferring effect. When the moisture within the vessel and particularly within the raw material therein has been vaporized to such an extent that the pressure in the vessel reaches a predetermined value, it is suddenly opened to expose the material to the atmospheric or reduced pressure thereby to convert the material into a porous puffed product. According to such conventional method, since the raw material is heated by heat conduction through the wall of the pressure vessel, which is externally heated by flame means, as described above, various difficulties have been involved including loss of food material due to parching and nonuniformity of the product due to the fact that the charged material cannot be heated as a whole to any uniform extent despite the agitation of the material simply effected by rotation of the pressure vessel. In addition, the percentage yield has generally been very poor particularly in the manufacture of puffed dry foods such as of vegetables and fruits.

According to the present invention, the heat required to heat the food material is obtained from a high-temperature pressure gas such as superheated steam at high pressure, which is passed through the packed layer of material to markedly increase the rate of heat transfer between the material and the heating fluid medium. By doing this, it is possible to substantially reduce the period of time during which the material is required to stay in the vessel and to heat the material under substantially uniform heat-treating conditions and the packed material can be held under an appropriate pressure and temperature freely selected according to the particular type of the material. Also, according to the present invention, the material can be heated without the danger of being parched and the resulting product is highly uniform. In addition, the puffed food obtained according to the present invention can be dried with extreme ease because of its high porosity and thus is suited for a dried preserve.

According to the present invention, there is provided a method of making puffed cereal and other foods comprising the steps of passing pressurized heating gas such as superheated steam directly through the layer of food material to heat the latter under pressure and suddenly ejecting the material thus heated into a gaseous space at a lower pressure.

According further to the present invention, there is provided an apparatus for making puffed cereal and other foods comprising a heating vessel for accommodating the food material and adapted to be sealed against the atmosphere, means for directing pressurized heating gas such as superheated steam through the layer of material accommodated in said heating vessel, and means for suddenly ejecting said material heated by said pressurized heating gas into a gas space at a lower pressure.

Also, according to the present invention, there is provided an apparatus of the character described for making puffed foods in a continuous fashion, in which said heating vessel comprises an inlet port for charging the material into the vessel, an outlet port for discharging the material therefrom, means associated with said inlet port for feeding the material into the heating vessel while maintaining the pressure therein isolated from the atmosphere, means associated with said outlet port for suddenly ejecting the material from the heating vessel while maintaining the pressure therein isolated from the atmosphere, and means provided in the heating vessel for continuously carrying the material fed through said inlet port to said outlet port.

The foregoing and other features and advantages of the present invention will become apparent from the following description when taken in conjunction with the accompanying drawings, which illustrate a few embodiments of the invention and in which:

FIG. 1 is a general elevational view of one embodiment of the present invention designed to make puffed foods in a continuous fashion;

FIG. 2 is a sectional view taken along the line II—II in FIG. 1, illustrating the structure of the preheating unit;

FIG. 3 is a plan view of the shelf plate shown in FIG. 1;

FIG. 5 is a side elevation of the same;

Figure 4:
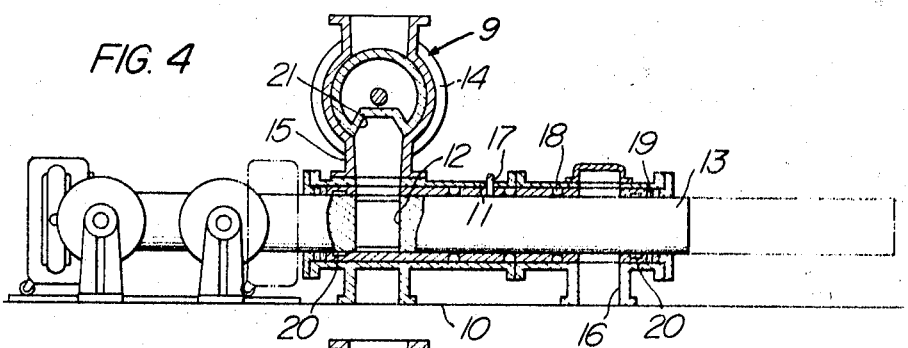
FIG. 4 is a detailed view, partly in cross section, of one of the solids transferring devices for the charging vessel shown in FIG. 1.
Figure 12:
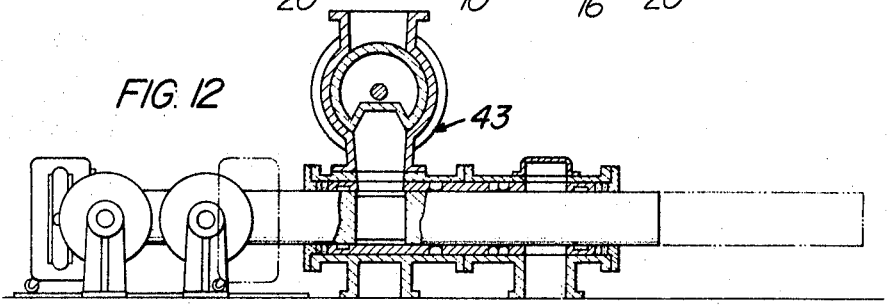

FIGS. 6 to 9 diagrammatically illustrate the stages of operation of the device shown in FIGS. 4 and 5;

FIG. 10 is a sectional view taken along the line X—X in FIG. 1;

FIG. 11 is a top view of the bladed carrier shown in FIG. 10;

FIG. 12 is a detailed view, partly in cross section, of the other solids transferring device shown in FIG. 1;

FIGS. 13 and 16 diagrammatically illustrate the stages of operation of the device shown in FIG. 12;

FIG. 17 is a general view, in cross section, of another embodiment of the present invention designed to operate in a continuous fashion; and FIG. 18 is a sectional view taken along the line XVIII—XVIII in FIG. 17;

Referring to the drawings and particularly to FIG. 1, which illustrates one example of continuous puffing unit, the raw material is fed in appropriate amounts to a preheater 3 by way of a rotary valve 2 having arranged therein a bladed rotor 1 variable in speed according to the handling rate required. Referring also to FIG. 2, the preheater 3 is provided at its top with a material inlet 4 and at the bottom with a material outlet 5 and includes a passageway defined by perforated plates 6 interconnecting the inlet 4 and outlet 5. The preheater is also provided with an inlet 7 and an outlet 8 for hot air, which is passed through the preheater to preheat or dry the raw material proceeding between the perforated plates 6. Leaving the preheater 3, the raw food material is charged into a heating vessel 22 by means of a device 9 designed to transfer solids while preventing any leakage of gaseous fluid. (For the details of the device 9, refer to Japanese patent publication No. 7457/1965.) Superheated steam or other heating gas at the gauge pressure of approximately 2 to 10 kg./cm.$^2$ is circulated through the vessel 22.

The solids transferring device 9 will be described in further detail with reference to FIGS. 4 and 5. As shown in FIG. 4, the device 9 includes a horizontal cylinder 11 mounted on a frame 10 and a piston member 13 slidably arranged in said cylinder 11 and formed with a through passage 12. The device also includes a tubular connection 15 in communication with the through passage 12 and with a rotary valve 14 arranged over the rear portion of the cylinder 11 to serve the purpose of transferring the solids in predetermined quantities. An outlet 16 is provided on the underside of the front portion of cylinder 11 and an exhaust port 17 is provided between the tubular connection 15 and outlet 16. Packings 18 are also arranged between the tubular connection 15 and outlet 16 at appropriate intervals to prevent gas leakage therebetween. A packing element 19 is arranged at one end of the cylinder 11 for the purpose of preventing leakage of the gaseous fluid to the atmosphere and a bearing unit 20 is arranged at the other end of the cylinder to support the piston 13 at its adjacent end. The rotary valve 14 is operable in association with the piston 13 and includes a casing and a rotor freely rotatably mounted therein and formed with a recessed cavity 21 extending along a portion of its periphery to receive material from the preheater 3.

The operation of the solids transferring device 9 will next be described with reference to FIGS. 6 to 9. At the operation stage shown in FIG. 6, the through passage 12 formed in the piston 13 is in alignment with the inlet port 23 (FIG. 1) of the heating vessel 22, charging the raw material therein. At this stage, the recessed cavity 21 formed in the rotor of the rotary valve 14 is receiving material from the preheater. Next, when the rotor is rotated clockwise through an angle of 90°, as shown in FIG. 7, the piston 13 retreats to place the passage 12 in communication with the exhaust port 17 formed in the wall of cylinder 11 to release the pressure gas held in the passage 12 into the atmosphere. When the valve rotor is rotated further through 90°, the piston 13 reaches its rearmost position, as shown in FIG. 8, where its passage 12 receives the material from the rotor cavity 21. Upon rotation of the valve rotor through further 90°, the piston 13 is advanced to assume its intermediate position, as shown in FIG. 9, and with continued rotation of the rotor through further 90° the piston is restored to its position shown in FIG. 6, placing its passage 12 again in alignment with the inlet port 23 of the heating vessel 22.

Referring again to FIG. 1, the heating vessel 22 has arranged around its periphery main inlet 25 and outlet 26 and an auxiliary inlet 27 for superheated steam in addition to material inlet and outlet ports 23 and 24. The outer casing of the heating vessel 22 is made pressure-resistant including a body 28 and dished end plates 29. Referring also to FIG. 10, a shelf plate 31 is fixedly mounted in the vessel 22 to receive the material charged therein. A substantial area 30 of the shelf plate 31 is perforated to allow passage of superheated steam therethrough. A portion of the shelf plate 31 outside the perforated area is opened as at 32 to allow downward passage of the material through the shelf plate. The opening 32 is directly connected with the outlet port 24 of the heating vessel 22 and thus the superheated steam introduced therein through inlet 25 is forced to flow through the perforated area 30 of the plate 31. Overlying the shelf plate 31 is a bladed carrier rotor 33 with an appropriate spacing from the plate 31. The carrier rotor has an array of radially inclined and circular blades 33 defining compartments 34′, as clearly shown in FIGS. 10 and 11 to serve the purpose of enabling the material to be heat-treated under uniform conditions and of preventing unwanted collapsing of the material otherwise occurring with rotation of the blades 33. The carrier rotor is fixedly mounted on a rotary shaft 34, which extends downwardly through a stuffing box 35 and is supported by a bearing unit 36. Also, the shaft 34 is driven from a speed change gear, not shown, through mating bevels 37 so that the period of time during which the material is held in the heating vessel 22 can be freely selected. The carrier rotor includes a tubular hub structure 38, which carries the array of blades 33, and packings 40 and 41 are properly arranged in the hub structure. One of the packings 40 is intended to serve the purposes of preventing any heating gas entering the structure 38 through the clearances between the shaft 34 and structure 38, between the structure and shelf plate 31, and between the shaft 34 and resin bearing 39 from shortcircuiting to the opening 32. The other packing 41 is provided to serve the purpose of preventing shortcircuiting of the heating gas to the opening 32.

Referring again to FIG. 10, the material falling at the location indicated by the chain-dotted line 42 is received in compartments 34′ of the carrier rotor and is advanced in the direction indicated by the arrow while being subjected to the action of the superheated steam coming through the perforated area 30 of the shelf plate 31. Reaching the opening 32 in the plate 31, the material is released into the material outlet port 24 (FIG. 1) and, subsequently, the material together with the gaseous fluid within the heating vessel is suddenly ejected into a holder 44 by way of another solids transferring device 43. The holder 44 is made of wire netting and thus is in free communication with the atmosphere. It will be readily understood that the material ejected into such holder is instantly expanded to form puffed product.

Reference numeral 45 indicates a drain shield and 46 indicates a shrouding ring also serving the drain shielding purpose. The outlet port 24 is connected with the opening 32 in the shelf plate 31 by way of a chute for convenience in assembling and disassembling the outlet structure and an O-ring 47 is inserted between the chute and the outlet port 24 to prevent shortcircuiting of heating gas. The heating vessel is provided at its bottom with a drain outlet 48. A levelling plate D is arranged over the carrier rotor 33 for the purpose of levelling the material deposited on the shelf plate 31.

The solids transferring device 43 lying between the outlet port 24 and the holder 43 is of the construction shown in FIG. 12 and is designed to transfer solids while preventing any leakage of the material ejecting gaseous fluid. The construction of this device 43 is substantially the same as the one 9 shown in FIG. 4 except that the device 43 lacks any gas exhaust port like the one 17 in FIG. 4 and includes a different arrangement of packings corresponding to those 18 in FIG. 4. The operation of the device 43 is substantially similar to that of the device 9, as diagrammatically illustrated in FIGS. 13 to 16 and will not be described herein in any detail for simplicity's sake.

The puffed material is delivered through a drier or cooler unit as required. Referring to FIG. 1, the puffed material from the holder 44 entering the drier or cooler unit through inlet port 49, is advanced by a conveyor belt 50 of wire netting through the unit while undergoing the action of hot or cold air entering through an air inlet 51 and is discharge through outlet port 52 as a dry puffed food. Reference numeral 53 indicates an outlet for hot or cold air and 54 indicates rotating drums carrying the conveyor belt 50.

With the above-described puffing apparatus, it will be appreciated that since the heat required to heat the food material is given by high-temperature pressure gas or superheated steam, which is passed through the layer of material packed in the heating vessel to increase the rate of heat transfer between the material and the gaseous fluid, the period of time during which the material is required to stay in the vessel is substantially reduced to markedly enhance the output capacity of the apparatus and that, by the use of superheated steam or pressure gas as a heating medium, the construction and operation of the apparatus are substantially simplified while making it possible to maintain within the vessel an appropriate puffing pressure and temperature freely selected according to the particular type of material being processed and to heat the material under uniform heat-treating conditions completely eliminating the danger of the material being so parched as to result in a product of poor quality. The wheat puffing tests conducted with the puffing apparatus have shown that wheat grains of a moisture content of 13 w./w. percent are expanded to three times their original volume when processed at the rate of 100 kg. per hour with the heater inlet temperature of superheated steam of 260° C., its outlet temperature of 190° to 200° C., the pressure within the heating vessel of 7.5 to 8 kg./cm.$^2$ gauge, the length of staying time during which grains are held in the vessel of 2 minutes, and the flow rate of superheated steam of 180 kg./hr.

FIGS. 17 and 18 diagrammatically illustrate another form of heating vessel usable according to the present invention in place of the above-described heating vessel 22. This form of heating vessel includes a pressure-resistant body or casing 55 having a material inlet port 56 and a material outlet port 57 at the top and bottom, respectively. Arranged in the casing 55 is a rotor 58 which is driven by a variable speed drive unit, not shown, and is formed around the periphery with a number of holding cavities 59.

An inlet 60 to the rotor 58 and the material inlet port 56 of the heating vessel are interconnected by perforated plates 61. Superheated steam entering the vessel through main inlet 62 proceeds as indicated by the arrowed line while heating the material descending through the space between the perforated plates 61 and finally leaves the vessel through outlet 63. Superheated steam or heating gas entering the vessel through auxiliary inlet 64 proceeds as indicated by the arrowed line while further heating the material as it is released from the holding cavities 59 in the rotor 58 and finally leaves the vessel through outlet 65. Part of the auxiliary superheated steam is directed through an opening 66 into the upper space of the vessel to join with the main stream of superheated steam. As shown, the path of the main stream of superheated steam is defined to direct the heating fluid through the layer of material descending between the perforated plates 61 by partitions 67 which carry at the inner ends axially extending plates 68. These plates 68 are sized larger than the distance C between the perforated plates 61. As inner tubular shell 69 is provided to prevent any drain from contacting the material being heated. By the use of such form of heating vessel, it will be appreciated that higher heat economies and an improved heating efficiency can be realized while providing different advantages including reduction in size of the apparatus, ease of condition control, uniformity in heat treatment of the material and hence elimination of the danger of the material being parched.

It is to be noted that the present invention is also advantageous in that puffed food made according to the present invention is highly porous and thus can be dried with extreme ease.

Though a few embodiments of the present invention have been shown and described herein, it is to be understood that it is not to be restricted to the details set forth but many changes and modifications may be made without departing from the spirit and scope of the present invention as defined in the annexed claims.

What is claimed is:

1. An apparatus for making puffed cereal and other foods comprising a heating vessel for accommodating the food material and adapted to be sealed against the atmosphere, an inlet port for charging the material into the vessel, an outlet port for discharging the material therefrom, means associated with said inlet port for feeding the material into the heating vessel in a layer of predetermined thickness while maintaining the pressure therein isolated from the atmosphere, means associated with said outlet port for suddenly ejecting the material from the heating vessel while maintaining the pressure therein isolated from the atmosphere, means for directing pressurized heating gas such as superheated steam through said layer of material accommodated in said heating vessel, and means provided in the heating vessel for continuously carrying the material fed through said inlet port to said outlet port, characterized in that said means provided in the heating vessel for continuously carrying the material fed through said inlet port to said outlet port includes a rotatable horizontal framework having a multiplicity of bottomless compartments and a horizontal material support plate fixed relative to the body of the heating vessel immediately adjacent to the underside of said framework, means for laying the material fed into the heating vessel in said compartments of said framework to a substantially uniform thickness, said support plate including a substantial portion taking the form of a perforated plate and the remaining portion having an opening of a substantial size, whereby said heating gas is directed through said perforated plate to heat the material laid in said compartments and the material thus heated is caused to fall through said opening into said ejecting means.

2. An apparatus for making puffed cereal and other foods comprising a heating vessel for accommodating the feed material and adapted to be sealed against the atmosphere, an inlet port for charging the material into the vessel, an outlet port for discharging the material therefrom, means associated with said inlet port for feeding the material into the heating vessel in a layer of predetermined thickness while maintaining the pressure therein isolated from the atmosphere, means associated with said outlet port for suddenly ejecting the material from the heating vessel while maintaining the pressure therein isolated from the atmosphere, means for directing pressurized heating gas such as superheated steam through said layer of material accommodated in said heating vessel, and means provided in the heating vessel for continuously carrying the material fed through said inlet port to said outlet port, characterized in that said means provided in the heating vessel for continuously carrying the material fed through said inlet port to said outlet port includes a passageway defined by perforated plates vertically arranged under the delivery port of said means for feeding the material into the heating vessel, and a rotor rotatably arranged at the bottom of said passageway and having a multiplicity of blades about its periphery, the arrangement being such that the heating gas is led through said perforated plates to heat the material descending through said passageway.

References Cited

UNITED STATES PATENTS

| | | | |
|---|---|---|---|
| 1,639,909 | 8/1927 | Suzuki | 99—238 |
| 2,622,985 | 12/1952 | Haughey et al. | 99—81 |
| 3,088,825 | 5/1963 | Topalian et al. | 99—68 |
| 3,128,690 | 4/1964 | Maehl | 99—238 |

A. LOUIS MONACELL, Primary Examiner

J. R. HOFFMAN, Assistant Examiner

U.S. Cl. X.R.

99—82